United States Patent
Strauss

(10) Patent No.: US 12,093,295 B2
(45) Date of Patent: Sep. 17, 2024

(54) SYSTEMS AND METHODS FOR AN INTERACTIVE CONTENT MANAGEMENT SYSTEM

(71) Applicant: Pantheon Systems, Inc., San Francisco, CA (US)

(72) Inventor: David Timothy Strauss, San Francisco, CA (US)

(73) Assignee: PANTHEON SYSTEMS, INC., San Francisco, CA (US)

( * ) Notice: Subject to any disclaimer, the term of this patent is extended or adjusted under 35 U.S.C. 154(b) by 120 days.

(21) Appl. No.: 17/670,297

(22) Filed: Feb. 11, 2022

(65) Prior Publication Data

US 2023/0259542 A1    Aug. 17, 2023

(51) Int. Cl.
| | |
|---|---|
| *G06F 16/33* | (2019.01) |
| *G06F 16/332* | (2019.01) |
| *G06F 16/335* | (2019.01) |
| *G06F 16/35* | (2019.01) |
| *G06F 16/958* | (2019.01) |

(52) U.S. Cl.
CPC ...... *G06F 16/3334* (2019.01); *G06F 16/3328* (2019.01); *G06F 16/335* (2019.01); *G06F 16/35* (2019.01); *G06F 16/958* (2019.01)

(58) Field of Classification Search
CPC ............ G06F 16/3334; G06F 16/3328; G06F 16/958; G06F 16/35; G06F 16/335
USPC ...................................................... 707/728
See application file for complete search history.

(56) References Cited

U.S. PATENT DOCUMENTS

| | | | |
|---|---|---|---|
| 2014/0019507 A1* | 1/2014 | Slakman | G06Q 10/10 709/201 |
| 2014/0304774 A1* | 10/2014 | Bejerasco | G06F 16/285 726/3 |
| 2015/0220225 A1* | 8/2015 | Jiang | G06F 16/958 705/26.8 |
| 2019/0151758 A1 | 5/2019 | Anglin et al. | |

OTHER PUBLICATIONS

Foreign Search Report on PCT Dtd Jun. 15, 2023.
Powell, Thomas A., "HTML & CSS: The Complete Reference, Fifth Edition", Dec. 31, 2010, pp. 1-857, XP093051519, https://www.dcpehvpm.org/E-Content/BCNBCA-II/Web%20Technology/the-complete-ref e rence-html-css-fifth-editi on. pdf.

* cited by examiner

*Primary Examiner* — Shahid A Alam
(74) *Attorney, Agent, or Firm* — Foley & Lardner LLP

(57) ABSTRACT

In accordance with some aspects of the present disclosure, an apparatus is disclosed. In some embodiments, the apparatus includes a processor and a memory. In some embodiments, the memory includes programmed instructions that, when executed by the processor, cause the apparatus to receive, from a backend, content represented as unstructured data, parse the content into content groups, wherein each content group has common characteristics, map each content group to a defined field based on the common characteristics of the content group, generate structured data in which each content group complies with constraints of the corresponding defined field, and send the structured data to a frontend to be displayed on a website.

14 Claims, 5 Drawing Sheets

SYSTEMS AND METHODS FOR AN INTERACTIVE CONTENT MANAGEMENT SYSTEM

BACKGROUND

A content management system (CMS) frontend is typically created in a way that is separated from a content repository/backend of a website. The frontend is generally stateless or close to stateless. In other words, it does not manage the content itself.

SUMMARY

The disclosure relates generally to content management and, more particularly, to an interactive content management system.

In accordance with some aspects of the present disclosure, an apparatus is disclosed. In some embodiments, the apparatus includes a processor and a memory. In some embodiments, the memory includes programmed instructions that, when executed by the processor, cause the apparatus to receive, from a backend, content represented as unstructured data, parse the content into content groups. In some embodiments, each content group has common characteristics. In some embodiments, the memory includes programmed instructions that, when executed by the processor, cause the apparatus to map each content group to a defined field based on the common characteristics of the content group, generate structured data in which each content group complies with constraints of the corresponding defined field, and send the structured data to a frontend to be displayed on a website.

In some embodiments, the common characteristics include one or more of a location of the content, size of the content, font of the content, type of the content, or subject matter of the content. In some embodiments, the memory includes further programmed instructions that, when executed by the processor, cause the apparatus to remove content of at least one of the content groups. In some embodiments, a defined field is one or more of a title field, a body field, or an image field.

In some embodiments, the memory includes further programmed instructions that, when executed by the processor, cause the apparatus to change content of at least one of the content groups to comply with the constraints of the corresponding defined field. In some embodiments, the memory includes further programmed instructions that, when executed by the processor, cause the apparatus to send an overlay to the frontend to be displayed over the structured data.

In some embodiments, the memory includes programmed instructions that, when executed by the processor, cause the apparatus to receive the unstructured data from the backend by consuming a first application programming interface (API) and send the unstructured data to the frontend by providing a second API.

In accordance with some aspects of the present disclosure, a method is disclosed. In some embodiments, the method includes receiving, from a backend, content represented as unstructured data, parsing the content into content groups. In some embodiments, each content group has common characteristics. In some embodiments, the method includes mapping each content group to a defined field based on the common characteristics of the content group, generating structured data in which each content group complies with constraints of the corresponding defined field, and sending the structured data to a frontend to be displayed on a website.

In accordance with some aspects of the present disclosure, a computer-readable storage medium is disclosed. In some embodiments, the medium includes instructions that, when executed by the processor, cause the processor to receive, from a backend, content represented as unstructured data, parse the content into content groups. In some embodiments, each content group has common characteristics. In some embodiments, the medium includes instructions that, when executed by the processor, cause the processor to map each content group to a defined field based on the common characteristics of the content group, generate structured data in which each content group complies with constraints of the corresponding defined field, and send the structured data to a frontend to be displayed on a website.

The foregoing summary is illustrative only and is not intended to be in any way limiting. In addition to the illustrative aspects, embodiments, and features described above, further aspects, embodiments, and features will become apparent by reference to the following drawings and the detailed description.

Figure 1A:
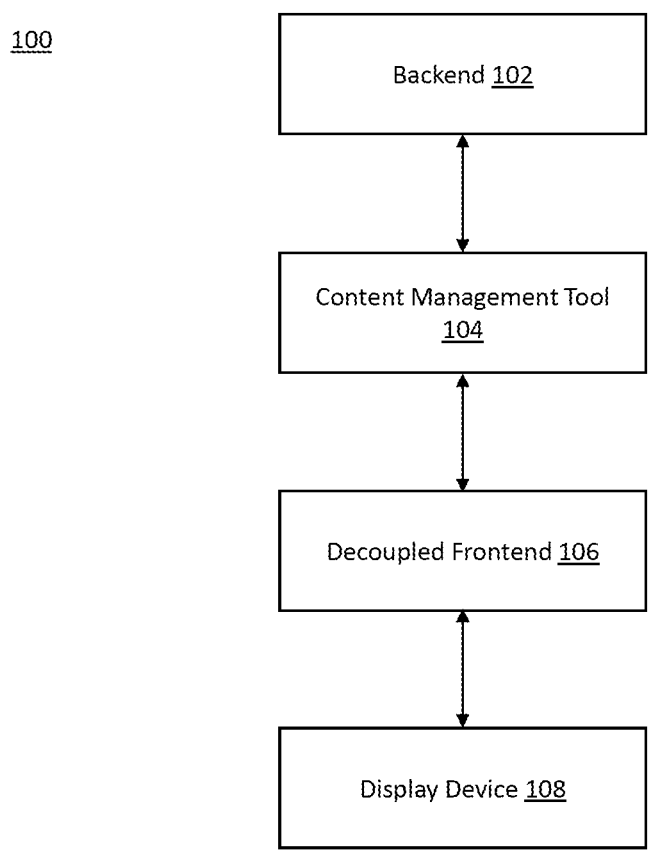
FIG. 1A illustrates a block diagram of a content management system, in accordance with some embodiments of the present disclosure.

The foregoing and other features of the present disclosure will become apparent from the following description and appended claims, taken in conjunction with the accompanying drawings. Understanding that these drawings depict only several embodiments in accordance with the disclosure and are therefore not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

As websites have become the cornerstone of customer experience, content management systems (CMSs) continue to frustrate marketers who provide the content for such CMSs. In addition to publishing content in response to market events and planned business activities, marketers face algorithm changes affecting content ranking on an ever-growing number of platforms and distribution channels. Producing content under these circumstances often necessitates developing it in one place with superior collaboration tools (e.g. Google Docs, Microsoft 365) and later migrating the content to a CMS (e.g., Drupal, WordPress). This migration detaches the published content from its sourcing, leaving content creators without the ability to easily access and edit the content using the original tools where the content was developed. Editing content directly in a CMS often proves clunky, particularly with other team members and external contributors. The cause of the clunky experience is often multifaceted: inability for multiple users to edit simultaneously, inability to track changes and suggestions, inability to leave comments on blocks of text, and the inability to retain the same user accounts and access/sharing controls. What is needed is a better system for marketers to provide content and collaborate all the way from content creation through publication and later revision.

Described herein are embodiments of an interactive CMS tool that consume an application programming interface (API) to receive dirty documents, provide workflow and clean-up of documents, provide approval for revision, and re-export the cleaned-up content through another API to be rendered on a channel or device or consumed by a decoupled website frontend (e.g., Gatsby, NextJS). The interactive CMS tool can wrap around third-party backends. Advantageously, content creators can enjoy an improved, seamless experience by being able to edit directly at the source, leveraging the interactive workflow and clean-up features, without experiencing all the clunkiness of traditional backends. Additionally, the CMS tool can enable the frontend to provide efficient access for content creators to the source documents by showing the "ingredients" of the website on the web page itself, through an overlay.

FIG. 1A illustrates an exemplary block diagram of a content management system 100, in accordance with some embodiments of the present disclosure. The content management system 100 includes a backend 102. In some embodiments, content is stored in the backend 102. The content stored in the backend 102 may be referred to as source data. In some embodiments, the content is stored as a file, a plain text document, a presentation deck, an image, a rich text document, etc. In some embodiments, a client edits the content stored in the backend 102. The client may be a system, a script, and/or an interface of a decoupled frontend 106 or a display device 108. The client may be automated or user (e.g., marketer, developer, or administrator) controlled. In some embodiments, the client retrieves the content from the backend 102, changes (e.g., edits, marks up, etc.) the content, and saves the edited content in the backend 102. In some embodiments, the backend 102 is a third-party platform/software/application. In some embodiments, the backend 102 is accessed as a service from the cloud.

The content management system 100 includes a content management tool 104 coupled to the backend 102. The content management tool 104 interfaces between the backend 102 and the decoupled frontend 106 to classify and clean up content in preparation of providing the content on a display device 108 such as one or more web pages. In some embodiments, the content management tool 104 is an interactive tool that responds to requests or selections from the client.

Although FIG. 1A shows an example of a content management system 100, the content management system 100 may include more, less, or different blocks. For example, the content management system 100 may include a content management tool 104 that delivers data directly to a display device 108, either so a client of the display device 108 can use the structured data for the client's own purpose or to be hydrated (e.g., transformed, translated, changed, filled, etc.) into human-readable form on the display device 108.

Figure 1B:
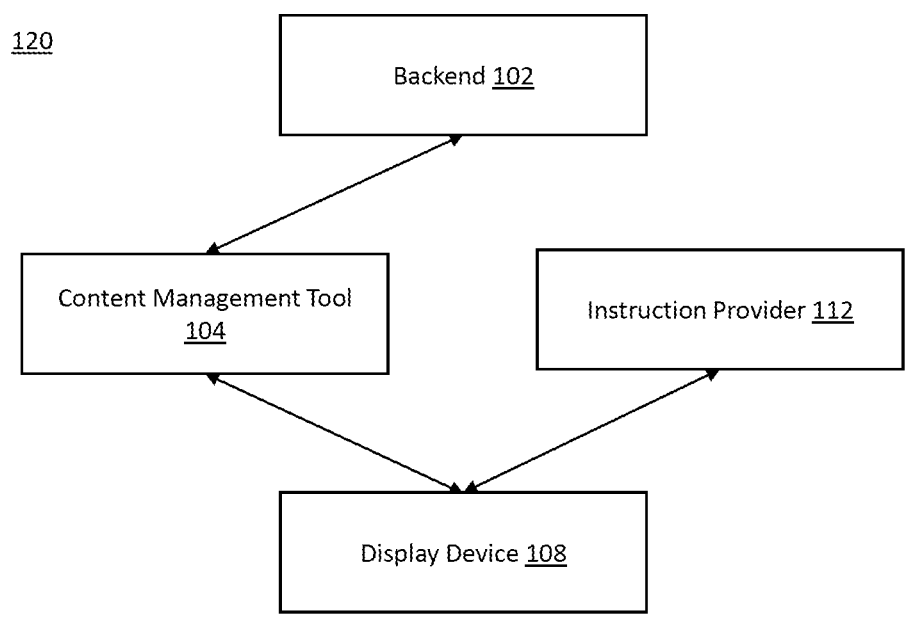
FIG. 1B illustrates a block diagram of yet another content management system, in accordance with some embodiments of the present disclosure.

FIG. 1B shows an embodiment of a content management system 120. In one embodiment, the content management tool 104 directly provides the data (e.g., XML or JSON) to the display device 108, and the instructions provider 112 provides a template and instructions to the display device 108 to hydrate the template with data provided by the content management tool 104, allowing display device 108 to generate a complete and renderable page with content. Updates to display device 108 from update-triggering events may merely require sourcing data directly from content management tool 104 and minimal or no data from the instruction provider 112. Update-triggering events may include client-driven navigation in display device 108, updates to data on the backend 102, interactions with the content management tool 104, or other events suitable for updating the display device 108. Embodiments of the content management system 120 reduce the latency of subsequent updates following the initial loading of a web site on display device 108 and the bandwidth necessary to deliver the updates.

Figure 1C:
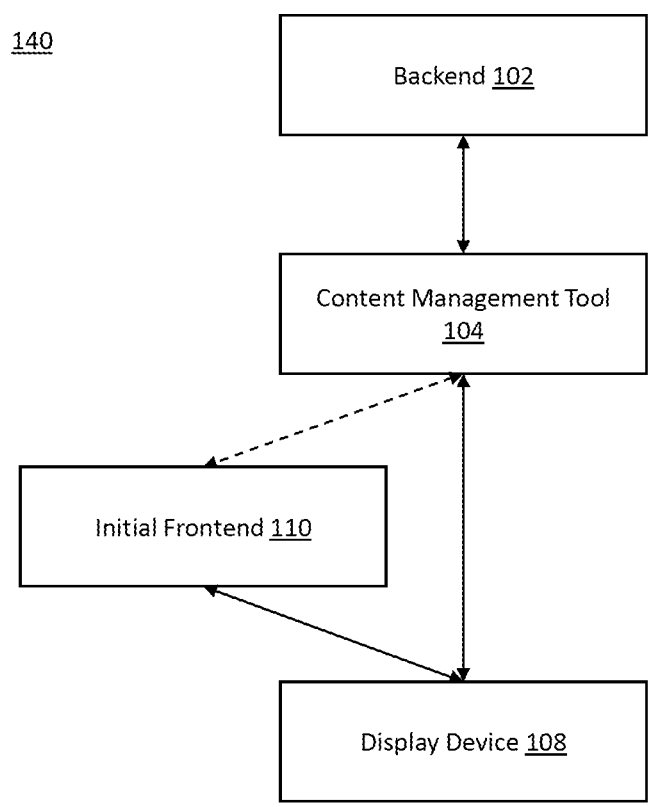
FIG. 1C illustrates a block diagram of another content management system, in accordance with some embodiments of the present disclosure.

FIG. 1C shows an embodiment of a content management system 140 that expands on the design of content management system 120 by sparing display device 108 from acquiring as many resources before initially rendering the page, reducing the latency for the first page load. In one embodiment, the content management system 140 includes an initial frontend 110 that provides instructions. In one embodiment, in a first iteration of data provided to a display device 108, the initial frontend 110 provides display device 108 with both a hydrated (i.e., ready to render) version of the page (similarly to a decoupled frontend 106 of FIG. 1A) as well as a template that the display device 108 can hydrate with data obtained from content management tool 104 when an update is triggered by an update-triggering event (for similar update-triggering events as in FIG. 1B). For subsequent iterations of the instructions and data, the display device 108 can directly obtain additional instructions and data (e.g., in XML) from the content management tool 104, leveraging the prior template and instructions from 110 to hydrate the template with data. Embodiments of the content management system 140 reduce the initial page-load latency as well as the latency of subsequent updates for display device 108.

Figure 2:
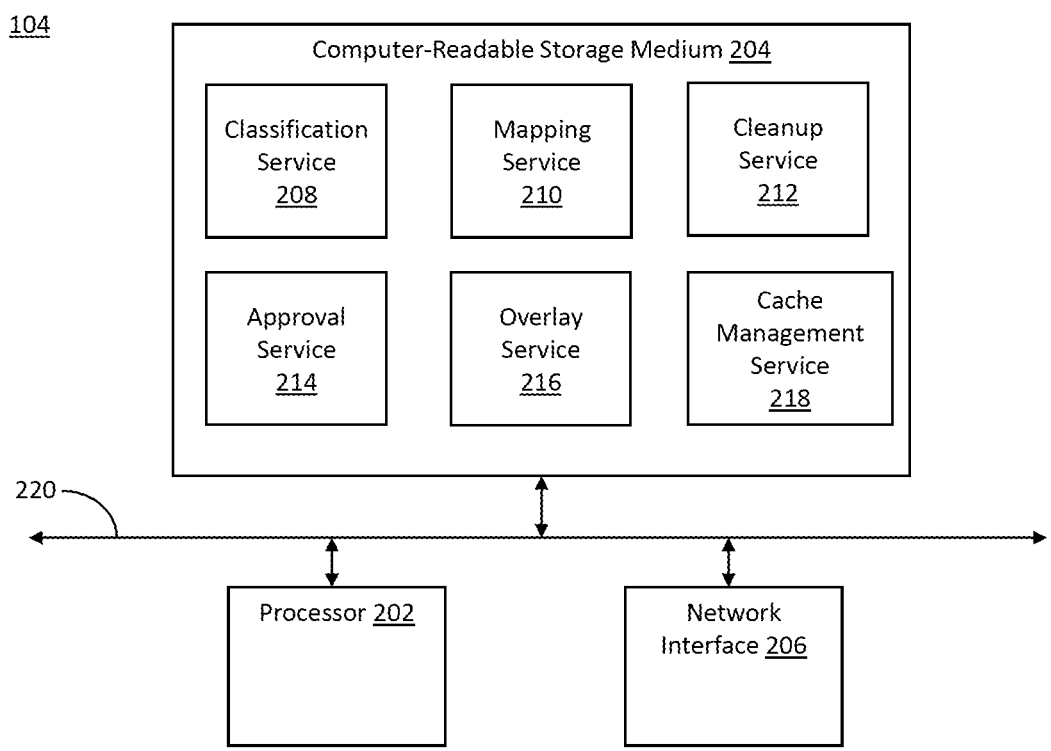
FIG. 2 illustrates a block diagram of a content management tool, in accordance with some embodiments of the present disclosure.

Referring now to FIG. 2, a block diagram of the content management tool 104 is illustrated, in accordance with some embodiments of the present disclosure. The content management tool 104 includes a processor 202. Processor 202 is configured to execute computer program code, scripts, applications, or services, such as a classification service 208, a mapping service 210, a cleanup service 212, an approval service 214, an overlay service 216, and a cache management service 218, encoded in computer-readable storage medium 204 (referred to herein as storage medium 204). In one or more embodiments, processor 202 is a central processing unit (CPU), a multi-processor, a distributed processing system, an application specific integrated circuit (ASIC), and/or a suitable processing unit.

The content management tool 104 includes the storage medium 204. In one or more embodiments, the storage medium 204 is an electronic, magnetic, optical, electromagnetic, infrared, and/or a semiconductor system (or apparatus or device). For example, the storage medium 204 includes a semiconductor or solid-state memory, a random access memory (RAM), a read-only memory (ROM), a magnetic tape, a removable computer diskette, a rigid magnetic disk, and/or an optical disk.

The storage medium 204 includes the classification service 208. The classification service 208 may be configured, arranged, and operable to organize or classify source documents based on their content and structure, as well as suggest data structures that would be applicable targets for mapping. The classification service 208 includes instructions that, when executed by the processor 202, cause the content management tool 104 to classify content received from the backend 102. In some embodiments, the content management tool 104 may consume an application programming interface (API) provided by the backend 102 to receive the content. In some embodiments, the content is represented as unstructured data (e.g., unstructured rich text, unstructured presentation documents, etc.). The unstructured data may be delivered as part of a data structure (e.g., container). A body (e.g., content) of the unstructured data may be unstructured.

In some embodiments, the classification service 208 includes instructions that, when executed by the processor 202, cause the content management tool 104 to parse the content into content groups. In some embodiments, the content is parsed such that content in each content group has common characteristics. In some embodiments, the common characteristics include one or more of a location of the content, size of the content, font of the content, type of the content, or subject matter of the content. For example, content that includes capitalized words at the top of a page can be in a first content group and text that is in a common font that is organized in paragraphs can be in a second content group.

In some embodiments, the classification service 208 enables an owner of data to organize by any organization model that is suitable for the owner, rather than to organize data in a rigid system. In one embodiment, the classification service 208 explicitly suggests what a document type is or where data could be located (e.g., in what folder to place the data). In one embodiment, the classification service 208 is aware of the nature of the document but does not suggest what the document type is or where the data could be located. In some embodiments, the classification service 208 changes a location of the data. In some embodiments, the classification can attach classification data to a document in place without changing a location of the data. Advantageously, this lets people organize data based on the teams and individuals they collaborate with rather than the data they are working with.

In some embodiments, the classification service 208 can use machine learning to classify data. For example, the classification service 208 can recognize that documents are similar, either based on similar attributes, training data, or some other inputs. The classification service 208 can classify the documents as a similar document type based on this analysis.

The storage medium 204 includes the mapping service 210. The mapping service 210 may be configured, arranged, and operable to map document content to well-defined data structures, such as for consumption by the decoupled frontend 106. The mapping service 210 can determine what an appropriate mapping is and choose the applicable mapping. In some embodiments, the mapping service 210 includes instructions that, when executed by the processor 202, cause the content management tool 104 to map each content group to a defined field based on the common characteristics of the content group. Examples of a defined field are a title field, a body field, an image field, etc. In one example, a content group of content that includes capitalized words at a top of a page is mapped to a title field. In another example, a content group of text that is in a common font that is organized in paragraphs is mapped to a body field. The mapping may be automatic, e.g., without requiring the client to copy content into defined fields. The mapping service 210 may provide recommendations for mapping content or content groups to defined fields to the client, and the client can select one or more of the mappings.

In some embodiments, the storage medium 204 includes a cleanup service 212. In some embodiments, the cleanup service 212 includes instructions that, when executed by the processor 202, cause the content management tool 104 to remove or alter content of at least one of the content groups. For example, empty paragraphs may be removed. The cleanup service 212 may provide recommendations for cleanup to the client, and the client can select one or more of the recommendations.

In some embodiments, the cleanup service 212 cleans up a document in preparation for the document being made available by the API of the content management tool 104 (e.g., cleanup-in-flight) without altering the source document. In some embodiments, the cleanup service 212 alters the source document (e.g., cleanup-in-place).

In some embodiments, the classification service 208, the mapping service 210, the cleanup service 212, or some other service includes instructions that, when executed by the processor 202, cause the content management tool 104 to generate structured data. In some embodiments, the structured data is one of data accessible through an API or data formatted using JavaScript Object Notation (JSON) format. In some embodiments, the structured data is generated such that each content group complies with constraints of the corresponding defined field. For example, a formatted text field may allow options like bold or italic text but not a choice of font or typeface. In some embodiments, the mapping service 210 includes instructions that, when executed by the processor 202, cause the content management tool 104 to change the content in order to comply with the constraints of the corresponding defined field. The constraints of each defined field may be specified in a policy or metadata associated with the respective defined field.

In some embodiments, the storage medium 204 includes an approval service 214. In some embodiments, the approval service 214 includes instructions that, when executed by the processor 202, cause the content management tool 104 to indicate whether structured data has gotten approval for revision, to be sent to the decoupled frontend 106, or to be published on the display device 108. In some embodiments, the approval service 214 tracks multiple instances of structured data. In some embodiments, the approval service 214 includes instructions that, when executed by the processor 202, cause the content management tool 104 to indicate which structured data has received approval and which are waiting for approval.

In some embodiments, the storage medium 204 includes an overlay service 216. In some embodiments, the overlay service 216 includes instructions that, when executed by the processor 202, cause the content management tool 104 to generate an overlay. The overlay may provide a link to the backend 102 (e.g., to alter source content) or annotate on a page where content is sourced. In some embodiments, the content management tool 104 sends an overlay to the frontend to be displayed over the structured data.

The overly may suggest what is the most likely source content to be edited. In some embodiments, the overlay service 216 includes instructions that, when executed by the processor 202, cause the content management tool 104 to determine what is the most likely source content to be edited. The determination may be based on a heuristic, for example, an indicator for uniqueness. In one example, the overlay service 216 can identify, on how many webpages, certain content appears and if the number of webpages on which the content is identified is below (a) a predefined threshold or (b) a number of webpages on which other content appears on those pages, then the certain content can be identified as more or most likely to be edited. The overlay generation may also be non-heuristic by tracking the relationship of source content to display device output.

In some embodiments, the storage medium 204 includes a cache management service 218. In some embodiments, the cache management service 218 includes instructions that, when executed by the processor 202, cause the content management tool 104 to determine whether content at the edge (e.g., stored as a cookie or in a cache on the display device 108 or the decoupled frontend 106) is based on outdated source data. In some embodiments, the cache management service 218 includes instructions that, when executed by the processor 202, cause the content management tool 104 to recall (e.g., invalidate, delete, garbage collect, etc.) content at the edge that is based on outdated source data (e.g., source data that has been altered after being stored in a cache). Advantageously, content can be stored at the edge for longer because more storage space is available on the edge due to the cache management service 218 recalling out-of-date content.

In some embodiments, the content management tool 104 sends the structured data to the decoupled frontend 106 to be displayed/rendered on a display device 108. In some embodiments, the content management tool 104 provides an API for the decoupled frontend to request to receive the structured data.

The content management tool 104 includes a network interface 206. The network interface 206 allows the content management tool 104 to communicate with other components of the content management system 100 such as the backend 102 and the decoupled frontend 106. The network interface 206 includes wireless network interfaces such as Bluetooth, Wi-Fi, Global System for Mobile Communications (GSM), wideband code division multiple access (WCDMA), Long-Term Evolution (LTE), or 5G; or wired network interfaces such as Ethernet or Universal Serial Bus (USB).

In some embodiments, the content management tool 104 includes a bus 220. The bus 220 may couple the processor 202, the storage medium 204, and the network interface 206. The bus 220 can include a USB bus, a SCSI bus, a FireWire bus, an Ethernet bus, a Gigabit Ethernet bus, a Fibre Channel bus, or a Thunderbolt bus.

Referring back to FIG. 1A, the content management system 100 includes a decoupled frontend 106 coupled to the content management tool 104. In some embodiments, the decoupled frontend 106 interfaces the content management tool 104 with the display device 108. In some embodiments, the decoupled frontend 106 enables development of the graphical user interface (GUI) of the display device 108. In some embodiments, the decoupled frontend 106 accesses the content management tool 104 through an API to leverage the services of the content management tool 104.

The content management system 100 includes a display device 108 coupled to the decoupled frontend 106. The display device 108 may render or display the content. The display device 108 may include a website, a phone, a smartwatch or any device connected to the Internet of Things (IoT).

Figure 3:
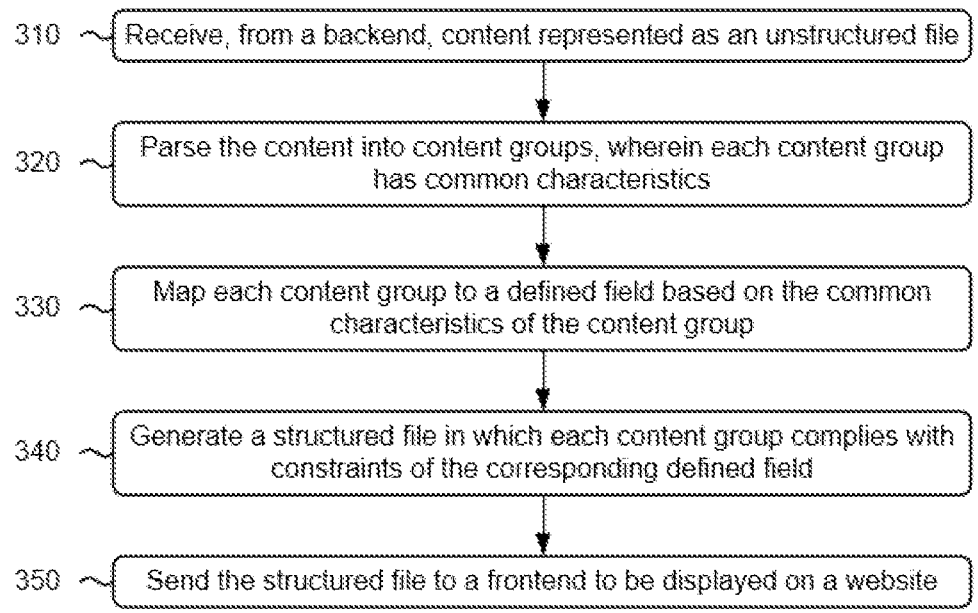
FIG. 3 is a flowchart of an example method, in accordance with some embodiments of the present disclosure.

FIG. 3 is a flowchart of an example method 300 associated with systems and methods for an interactive content management system. In some implementations, one or more process operations of FIG. 3 may be performed by a processor (or multiple processors) such as the processor 202. In some implementations, one or more process operations of FIG. 3 may be performed by another device or a group of devices separate from or including the processor. Additionally, or alternatively, one or more process operations of FIG. 3 may be performed by one or more other components of the CMS 100 or the CMS tool 104. Although FIG. 3 shows example operations of method 300, in some implementations, method 300 may include additional operations, fewer operations, different operations, or differently arranged operations than those depicted in FIG. 3. Additionally, or alternatively, two or more of the operations of method 300 may be performed in parallel.

In brief overview, method 300 may include receiving, from a backend, content represented as unstructured data (operation 310), parsing the content into content groups, wherein each content group has common characteristics (operation 320), mapping each content group to a defined field based on the common characteristics of the content group (operation 330), generating structured data in which each content group complies with constraints of the corresponding defined field (operation 340), and sending the structured data to a frontend to be displayed on a website (operation 350).

In more detail, in some embodiments, the processor receives, from a backend, content represented as unstructured data (e.g., unstructured rich text, unstructured presentation documents, etc.) (operation 310). For example, the processor receives the unstructured data from the backend by consuming a first application programming interface (API), In some embodiments, the processor parses the content into content groups, wherein each content group has common characteristics (operation 320). In some embodiments, the common characteristics include one or more of a location of the content, size of the content, font of the content, type of the content, or subject matter of the content.

In some embodiments, the processor maps each content group to a defined field based on the common characteristics of the content group (operation 330). In some embodiments, a defined field is one or more of a title field, a body field, or an image field.

In some embodiments, the processor generates structured data (e.g., data accessible through an API, a structured file, or data formatted using JSON format) in which each content group complies with constraints of the corresponding defined field (operation 340). The constraints for each defined field may be in a policy or metadata of the associated defined field. The processor may change content of at least one of the content groups to comply with the constraints of the corresponding defined field. The processor may remove content of at least one of the content groups (e.g., based on not complying with a constraint).

In some embodiments, the processor sends the structured data to a frontend to be displayed on a website (operation 350). For example, the processor sends the unstructured data to the frontend by providing a second API. The processor may send an overlay to the frontend to be displayed over the structured data.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. An apparatus comprising a processor and a memory, wherein the memory includes programmed instructions that, when executed by the processor, cause the apparatus to:
   receive, from a website backend, content represented as unstructured data;
   classify the content into content groups, wherein the content in each content group has common characteristics;
   map each content group to a defined field based on the common characteristics of the content in the content group;
   change content of at least one of the mapped content groups to comply with constraints of the corresponding defined field;
   generate, based on the mapped content groups, structured data in which each content group complies with constraints of the corresponding defined field, the structured data configured to hydrate a website with the content;
   send the structured data to a website frontend such that the website is hydrated with the content; and
   send an overlay to the frontend to be displayed over the website, the overlay providing a link to access the corresponding unstructured data in the backend.

2. The apparatus of claim 1, wherein the common characteristics include one or more of a location of the content, size of the content, font of the content, type of the content, or subject matter of the content.

3. The apparatus of claim 1, wherein the memory includes further programmed instructions that, when executed by the processor, cause the apparatus to remove content of at least one of the content groups, the removed content not complying with a constraint of the corresponding defined field.

4. The apparatus of claim 1, wherein a defined field is one or more of a title field, a body field, or an image field.

5. The apparatus of claim 1, wherein the memory includes programmed instructions that, when executed by the processor, cause the apparatus to:

receive the unstructured data from the backend by consuming a first application programming interface (API); and send the unstructured data to the frontend by providing a second API.

6. A computer-implemented method comprising:

receiving, by a processor, from a website backend, content represented as unstructured data;

classifying, by the processor, the content into content groups, wherein the content in each content group has common characteristics;

mapping, by the processor, each content group to a defined field based on the common characteristics of the content in the content group;

changing content of at least one of the mapped content groups to comply with constraints of the corresponding defined field;

generating, by the processor, based on the mapped content groups, structured data in which each content group complies with constraints of the corresponding defined field, the structured data configured to hydrate a website with the content;

sending, by the processor, the structured data to a website frontend such that the website is hydrated with the content; and sending an overlay to the frontend to be displayed over the website, the overlay providing a link to access the corresponding unstructured data in the backend.

7. The method of claim 6, wherein the common characteristics include one or more of a location of the content, size of the content, font of the content, type of the content, or subject matter of the content.

8. The method of claim 6, further comprising removing content of at least one of the content groups, the removed content not complying with a constraint of the corresponding defined field.

9. He method of claim 6, wherein a defined field is one or more of a title field, a body field, or an image field.

10. The method of claim 6, further comprising:

receiving the unstructured data from the backend by consuming a first application programming interface (API); and sending the unstructured data to the frontend by providing a second API.

11. A non-transitory computer readable storage medium comprising instructions stored thereon that, when executed by a processor, cause the processor to:

receive, from a website backend, content represented as unstructured data;

classify the content into content groups, wherein the content in each content group has common characteristics;

map each content group to a defined field based on the common characteristics of the content in the content group;

change content of at least one of the mapped content groups to comply with constraints of the corresponding defined field;

generate, based on the mapped content groups, structured data in which each content group complies with constraints of the corresponding defined field, the structured data configured to hydrate a website with the content;

send the structured data to a website frontend such that the website is hydrated with the content; and send an overlay to the frontend to be displayed over the website, the overlay providing a link to access the corresponding unstructured data in the backend.

12. The medium of claim 11, wherein the common characteristics include one or more of a location of the content, size of the content, font of the content, type of the content, or subject matter of the content.

13. The medium of claim 11, wherein the memory includes the programmed instructions that, when executed by the processor, further cause the apparatus to remove content of at least one of the content groups, the removed content not complying with a constraint of the corresponding defined field.

14. The medium of claim 11, wherein the memory includes the programmed instructions that, when executed by the processor, further cause the apparatus to:

receive the unstructured data from the backend by consuming a first application programming interface (API); and send the unstructured data to the frontend by providing a second API.

* * * * *